US006952334B2

(12) United States Patent
Ball et al.

(10) Patent No.: US 6,952,334 B2
(45) Date of Patent: Oct. 4, 2005

(54) LINEAR REGULATOR WITH OVERCURRENT PROTECTION

(75) Inventors: Alan Richard Ball, Gilbert, AZ (US); Alejandro Lara-Ascorra, Phoenix, AZ (US)

(73) Assignee: Semiconductor Components Industries, L.L.C., Phoenix, AZ (US)

( * ) Notice: Subject to any disclaimer, the term of this patent is extended or adjusted under 35 U.S.C. 154(b) by 31 days.

(21) Appl. No.: 10/681,813

(22) Filed: Oct. 7, 2003

(65) Prior Publication Data

US 2005/0073287 A1 Apr. 7, 2005

(51) Int. Cl.⁷ ................................................ H02H 9/08
(52) U.S. Cl. .................................... 361/93.9; 323/276
(58) Field of Search ............................... 323/274, 275, 323/279, 280, 276; 361/93.1, 93.9, 18

(56) References Cited

U.S. PATENT DOCUMENTS

| | | | | |
|---|---|---|---|---|
| 5,642,034 A | * | 6/1997 | Amano | 323/277 |
| 5,764,460 A | * | 6/1998 | Perillo et al. | 361/18 |
| 6,798,179 B2 | * | 9/2004 | Nakajima | 323/277 |

* cited by examiner

*Primary Examiner*—Shawn Riley
(74) *Attorney, Agent, or Firm*—Robert F. Hightower

(57) ABSTRACT

A power supply system (10) forms an active zone that facilitates the power supply system (10) enabling an output transistor (37) when the input voltage (30) is between a first voltage value and a second voltage value. When the output transistor is enabled, it forms a load current (35) having an instantaneous value that when averaged over the period of the input signal results in a desired average value of the load current.

18 Claims, 4 Drawing Sheets

10

10

70

LINEAR REGULATOR WITH OVERCURRENT PROTECTION

BACKGROUND OF THE INVENTION

The present invention relates, in general, to electronics, and more particularly, to methods of forming semiconductor devices and structure.

In the past, the electronics industry utilized various structures and methods to form ac to dc voltage regulators. Linear regulators were used for some applications. Linear regulators provided efficient regulation as long as the output voltage was close to the input voltage. As the input-to-output voltage differential increased, the efficiency decreased. Switching regulators also were used in many applications. The switching regulators required various external resistors, inductors, and capacitors that resulted in complex regulators. These external components also increased the system costs of the linear regulators.

Accordingly, it is desirable to have an inexpensive, efficient, simple to use ac to dc power supply system and power supply controller therefor.

BRIEF DESCRIPTION OF THE DRAWINGS

For simplicity and clarity of illustration, elements in the figures are not necessarily to scale, and the same reference numbers in different figures denote the same elements. Additionally, descriptions and details of well-known steps and elements are omitted for simplicity of the description.

DETAILED DESCRIPTION OF THE DRAWINGS

Figure 1:
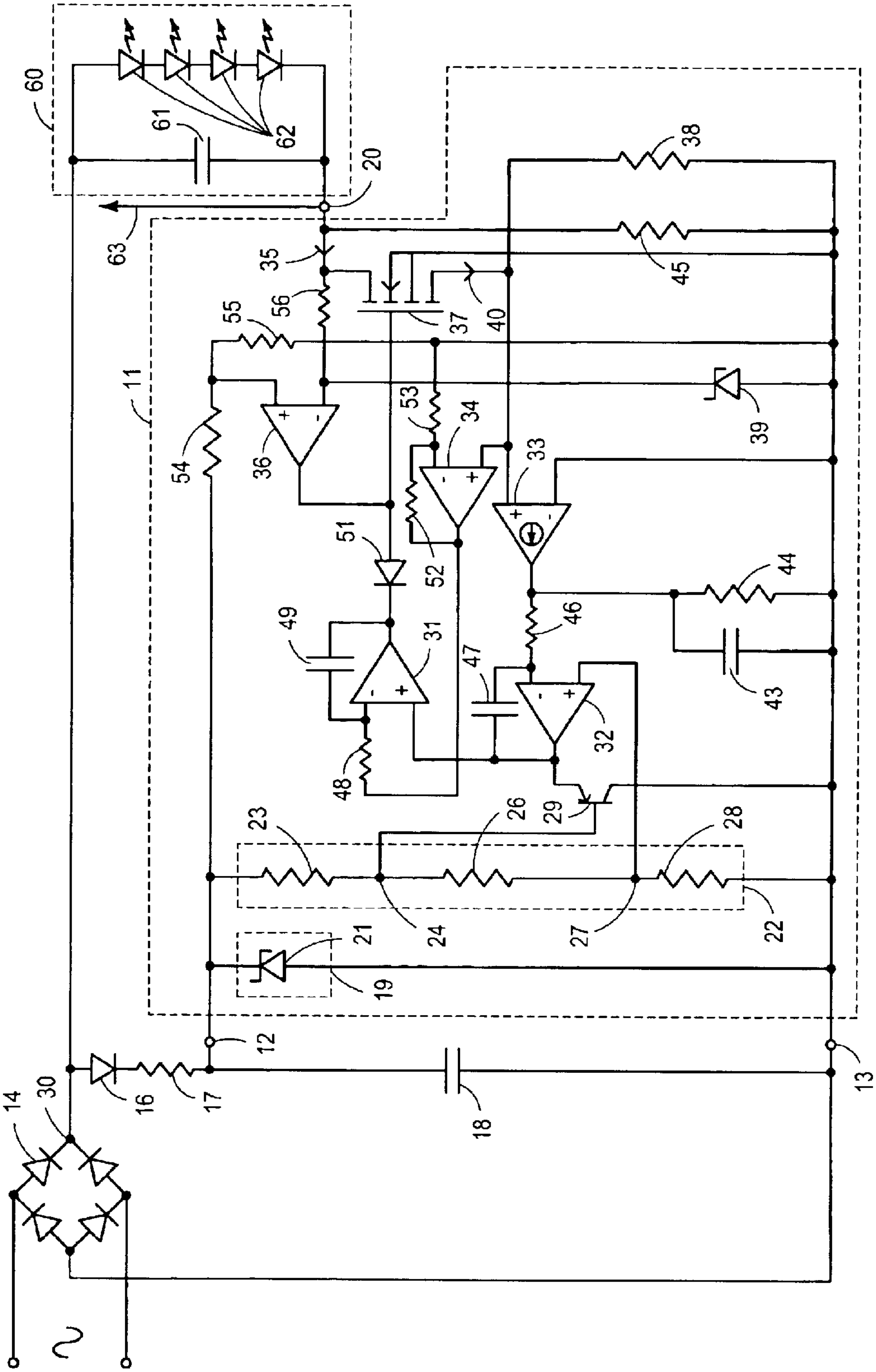
FIG. 1 schematically illustrates an embodiment of a portion of a power supply system in accordance with the present invention.

FIG. 1 schematically illustrates an embodiment of a portion of a power supply system 10 having a power supply controller 11 that provides a controlled output current to a load 60. In addition to controller 11, other components typically are connected externally to controller 11 in order to provide functionality for system 10 and controller 11. For example, load 60, a rectifier 14, a blocking diode 16, a filter resistor 17, and a filter capacitor 18 typically are connected externally to controller 11. Rectifier 14 receives an ac voltage, such as a household mains, and provides a rectified dc voltage on an output of rectifier 14. The output of rectifier 14 is connected to an input node or input 30 of system 10. Filter resistor 17 and filter capacitor 18 filter the input voltage from input 30 and provide a voltage to a voltage input 12 of controller 11. Blocking diode 16 prevents current flow from capacitor 18 to load 60.

Controller 11 typically includes a voltage regulator 19, a reference voltage generator or reference 22, a transconductance amplifier 33, an averaged current deviation amplifier 32, an instantaneous current error amplifier 31, an upper limit comparator 36, an output transistor 37, and a buffer amplifier or buffer 34. Controller 11 receives the voltage applied between voltage input 12 and a return 13, and responsively controls the average value of a load current 35 that flows through load 60. Controller 11 linearly controls transistor 37 to provide an instantaneous value of current 35 that, when averaged over the period of the input voltage on input 30, results in a desired average value of current 35 for load 60.

Regulator 19 and capacitor 18 function to provide an operating voltage for operating the various elements of controller 11 including buffer 34, comparator 36, and amplifiers 31, 32, and 33. Regulator 19 may be any one of a variety of voltage regulators that provides a regulated voltage. In the preferred embodiment, regulator 19 is a zener diode 21. In this preferred embodiment the values of resistor 17 and diode 21 are chosen to provide a suitable input voltage for regulator 19 and the value of capacitor 18 is chosen to provide suitable filtering of the operating voltage. Reference 22 of controller 11 may be any one of a variety of reference voltage generators that provides various reference voltages for controller 11. In the preferred embodiment, reference 22 is formed as resistors 23, 26, and 28 connected in series between input 12 and return 13. In this preferred embodiment, an average current reference node 27 is formed at the serial connection between resistors 26 and 28, and a clamping reference node 24 is formed at the serial connection between resistors 23 and 26.

Figure 2:
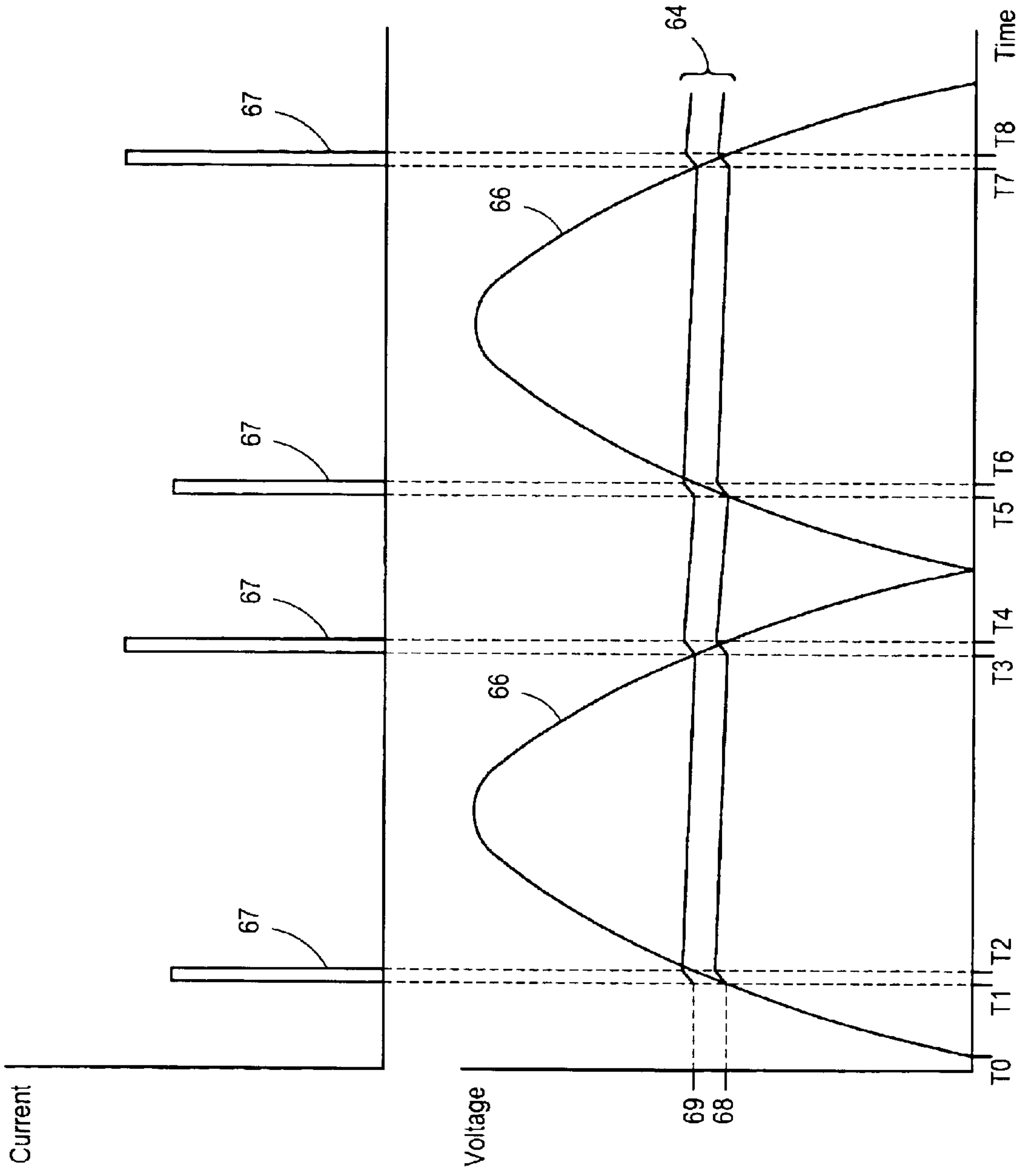
FIG. 2 is a graph having plots that illustrate the relationship of some signals within the power supply system of FIG. 1 in accordance with the present invention.

FIG. 2 is a graph having a plot 66 that represents the input voltage on input 30 and a plot 67 that represents the instantaneous value of load current 35. The abscissa represents time, the ordinate of plot 66 represents voltage, and the ordinate of plot 67 represents current. This description will have references to both FIG. 1 and FIG. 2. As will be seen hereinafter, the input voltage received on input 30 is portioned into an active zone 64 and a non-active zone. Active zone 64 is a band of input voltage values between a lower limit, illustrated by a voltage 68, and an upper limit, illustrated by a voltage 69.

During the operation of controller 11 and system 10, a load voltage 63 may be developed across load 60 between input 30 and a current output 20 of controller 11. The presence and the value of load voltage 63 depends on the nature of load 60. When the value of the input voltage on input 30 is less than the load voltage, the diodes in rectifier 14 are reversed biased which blocks current flow through load 60, thus, load current 35 is zero and system 10 inhibits load current 35 from flowing. Controller 11 is operating but current 35 is zero. When the input voltage is greater than load voltage 63, load current 35 flows through load 60 and controller 11 drives transistor 37 to control the average value of current 35. The nature of load 60 affects the value of load voltage 63, thus, the value of lower limit 68 of active zone 64. However, the operation is the same regardless of the value of the lower limit or the upper limit. For example, if the load is a pure resistor, load voltage 63 is zero when transistor 37 is not conducting and load current 35 begins to flow as soon as the input voltage is greater than zero, thus, the lower limit of active zone 64 is approximately zero. If the load has a capacitor such as capacitor 61, the capacitor becomes charged to the voltage dropped across the load when the load is operating. For the example, for load 60 including four light emitting diodes (LEDs) 62 in parallel with capacitor 61, capacitor 61 charges to a value required to operate LEDs 62. Assume that LEDs 62 have a total voltage drop of about six volts, then current 35 begins to flow when the input voltage is greater than six volts. Thus, the lower limit of active zone 64 becomes six volts. As will be seen hereinafter, current 35 only flows for a portion of a cycle of the input voltage. Thus, controller 11 forms the instantaneous value of current 35 so that averaging the instantaneous current over the period of the input voltage results in the desired average value of current 35.

When the input voltage is greater than load voltage 63, illustrated by voltage 68 in FIG. 2, load current 35 flows through load 60 and transistor 37 to return 13 and controller 11 linearly controls transistor 37 to provide an instantaneous value of current 35 that results in the desired average value of current 35. Controller 11 includes a sense circuit that generates a sense current 40. Current 40 has a value that is ratioed to the instantaneous value of load current 35 that is flowing through transistor 37. In the preferred embodiment, transistor 37 is a transistor that has a sense output which forms the sense circuit and provides a current that is ratioed to current 35. The sense output of the transistor provides sense current 40. Such transistors are well known to those skilled in the art and are also sold under the trademark SENSEFET. In other embodiments, current 40 may be formed by a variety of methods that are well-known to those skilled in the art, such as using a current mirror or a resistor through which current 35 flows. Current 40 flows through a sense resistor 38 and forms a sense voltage across resistor 38 that is representative of the instantaneous value of load current 35. Transconductance amplifier 33 receives and amplifies the sense voltage. A resistor 44 controls the gain of amplifier 33. In some embodiments resistor 44 may be connected externally to a semiconductor die on which controller 11 is formed so that the gain of amplifier 33 may be easily adjusted. In another embodiment, amplifier 33 may be an operational amplifier with feedback resistors instead of a transconductance amplifier. An averaging filter along with amplifier 33 form an averaging circuit that generates an averaged signal or averaged voltage that is representative of the average value of load current 35 by filtering the output of amplifier 33. A resistor 44 and a capacitor 43 form the averaging filter. The average value of current 35 can be adjusted by changing the gain of the averaging filter. The gain is changed by changing the value of resistor 44. Changing the value of capacitor 43 changes the bandwidth of the averaging filter. Either or both of resistor 44 and capacitor 43 may be external to a semiconductor die on which controller 11 is formed to facilitate changing the value of resistor 44 and capacitor 43. Amplifier 32 receives the averaged voltage, compares it to the average current reference voltage from node 27, and forms a deviation voltage that represents the deviation of the average value of current 35 from a desired average current value. As indicated previously, the desired average value can be selected by selecting the value of capacitor 43 and resistors 38 and 44. The average current reference voltage from node 27 is a constant value. Those skilled in the art realize that the value of the average current reference voltage from node 27 could also be changed to select the value of the desired average current. The deviation voltage formed by amplifier 32 is used as a reference voltage that represents the peak instantaneous value of current 35 required to form the desired average value of current 35. A capacitor 47, connected across amplifier 32, and a resistor 46 are chosen to provide amplifier 32 a low bandwidth so that the deviation voltage of amplifier 32 changes very slowly. The bandwidth typically is chosen between about one and sixty (1–60) Hz and preferably is about ten (10) Hz. A clamping circuit limits the value of the output of amplifier 32 in case there is a short or overload condition on output 20. In the preferred embodiment, the clamping circuit includes a transistor 29 that is coupled to the output of amplifier 32. Transistor 29 receives the clamping reference voltage from node 24 and clamps the output of amplifier 32 when the output voltage exceeds the clamping reference voltage plus the threshold voltage of transistor 29.

Buffer 34 amplifies the sense voltage from resistor 38 to ensure that the sense voltage is not disturbed by other portions of controller 11. A resistor 52 and a resistor 53 function to set the gain of buffer 34. The gain typically is between about ten (10) and one hundred (100) and preferably is about forty (40). Buffer 34 receives the sense voltage and applies a voltage representative of the sense voltage to an inverting input of error amplifier 31. Amplifier 31 also receives the deviation voltage from amplifier 32 and forms an error voltage on the output of amplifier 31 that limits the peak instantaneous value of current 35 to the value required to provide the desired average value of current 35. Thus, amplifier 31 amplifies the difference between the instantaneous current from the output of buffer 34 and the deviation from the desired average current, represented by the deviation voltage from the output of amplifier 32. Amplifier 31 drives transistor 37 with the error voltage so that transistor 37 conducts an instantaneous current 35 that is sufficient to provide the desired average value of current 35. A resistor 48 and a capacitor 49 are chosen to provide amplifier 31 a wide bandwidth so the error voltage quickly responds to changes in the instantaneous value of current 35. The desired average value of load current 35 can be adjusted by changing the value of resistors 38 and 44, thus, in some embodiments resistors 38 and 44 may be external to a semiconductor die on which controller 11 is formed. The instantaneous value of current 35 may vary each time transistor 37 is enabled as illustrated by the different peak values of plot 67. For example, the value of the input voltage may vary causing controller 11 to change the instantaneous value of current 35 in order to provide the desired average value of current 35.

Controller 11 is also formed to disable transistor 37 when the value of the input voltage between input 30 and return 13 is greater than the upper limit of active zone 64. The upper limit typically is chosen to be an upper limit of load voltage 63 at which load 60 can efficiently operate. The difference between the lower limit and the upper limit is the active zone differential. Typically, the active zone differential is between two to fifteen volts (2–15 V), and preferably is five volts (5 V). Thus the upper limit typically is between two to fifteen volts (2–15 V), and preferably is five volts (5 V), greater than the lower limit. The value of the voltage at output 20 is approximately zero when the value of the input voltage is less than or equal to the lower limit of active zone 64. As the value of the input voltage increases past the lower limit, the voltage at output 20 also begins to increase at the same rate as the input voltage. It can be seen that the voltage dropped across transistor 37 at output 20 also begins at zero and then follows the input voltage. Consequently, the voltage dropped across transistor 37 represents the active zone differential voltage. When the value of the input voltage increases to the upper limit, such as at a time T2 as illustrated by a voltage 69 in FIG. 2, the value of the voltage at output 20 has increased to the active zone differential voltage which causes the output of comparator 36 to go low and disable transistor 37. A resistor 54 and a resistor 55 are selected to provide a reference voltage for comparator 36 that establishes the active zone differential voltage. Thus, comparator 36 along with the applied reference voltage function as a disable circuit. Consequently, the value of the reference voltage received by comparator 36 is also representative of the upper limit of active zone 64. It can also be seen that, the upper limit of active zone 64 is a voltage equal to the load voltage plus the reference voltage applied to comparator 36. In some embodiments, a bleeder resistor 45 may be used to assist in discharging the capacitance of transistor 37 and assist in disabling transistor 37.

A blocking diode 51 allows the output of comparator 36 to be logically "OR"ed to the output of amplifier 31 such that if the output of either amplifier 31 or comparator 36 is low transistor 37 will be disabled. A zener diode 39 functions as an over-voltage protection device that clamps the value of the inverting input of comparator 36 to a value and that does not damage comparator 36. Resistor 56 provides an impedance to limit the current into diode 39. This could also be accomplished by an active circuit.

When the value of the voltage at input 30 decreases down to the upper limit of active zone 64 at a time T3, the voltage at output 20 also decreases to the active zone differential and the output of comparator 36 is goes high allowing amplifier 31 to once again drive transistor 37 to provide an instantaneous current 35 that keeps the average value of current 35 substantially constant. The value of the voltage at input 30 continues decreasing until it is once again equal to or less than load voltage 63, and current 35 no longer can flow. This operational sequence repeats each time the input voltage is within active zone 64, thus, it repeats for each half cycle of the input voltage applied to input 30. As a consequence, controller 11 enables transistor 37 four (4) times for each cycle or period of the input voltage.

From the prior description, it can be seen that controller 11 operates as a linear regulator when the input voltage is within active zone 64, and that controller 11 disables transistor 37 when the input voltage is greater than the upper limit of active zone 64.

In one example embodiment of controller 11, the input voltage at input 30 is a full wave rectified dc voltage having a peak value of approximately eighteen volts (18V). Regulator 19 is a zener diode having a zener voltage of approximately 8.2 volts that provides an equivalent operating voltage value for controller 11. Load 60 includes four LEDs 62 connected in series between input 30 and output 20. Each LED has a voltage drop of about one and a half volts (1.5 V). Load 60 also includes energy storage capacitor 61. Consequently, the lower limit of active zone 64 is determined by the voltage dropped across LEDs 62, and stored on capacitor 61, or about six volts. Resistors 54 and 55 were selected to provide an active zone differential voltage that is approximately five volts (5.0 V) and a corresponding active zone upper limit voltage that is about five volts greater than load voltage 63. Thus, transistor 37 is enabled when the input voltage at input 30 reaches approximately six volts (6 V), and comparator 36 disables transistor 37 when the input voltage reaches approximately eleven volts (11 V). Within active zone 64, current 35 provides a current to operate LEDs 62 and to charge capacitor 61. Outside of active zone 64, transistor 37 is disabled and LEDs 62 are a load for capacitor 61 and discharge capacitor 61. The value of capacitor 61 is chosen to keep load voltage 63 from drooping excessively during this portion of the period. Resistors 23, 26, and 28 were selected to provide an averaging current reference voltage at node 27 of approximately 0.2 volts and a clamping reference voltage at node 24 of approximately 4.5 V. For this example, the average value of load current 35 was approximately 79 milli-amps. Changing the input voltage to a peak value of fifteen volts resulted in current 35 decreasing to 78 milli-amps and changing the input voltage to a peak value of twelve volts resulted in current 35 decreasing to 76 milli-amps. Thus, controller 11 provided a current regulation of approximately 3.8% over a line voltage change of twenty percent (20%).

In order to provide this functionality, a first terminal of regulator 19 is connected to input 12 and a second terminal is connected to return 13. In the preferred embodiment, a cathode of diode 21 is connected to input 12 and an anode is connected to return 13. A first terminal of reference 22 is connected to input 12 and a second terminal is connected to return 13. In the preferred embodiment, a first terminal of resistor 23 is connected to input 12 and a second terminal is connected to node 24 and to a first terminal of resistor 26. Also in the preferred embodiment a second terminal of resistor 26 is connected to node 27 and to a first terminal of resistor 28 while a second terminal of resistor 28 is connected to return 13. Comparator 36 has a non-inverting input connected to a first terminal of resistor 54 and a first terminal of resistor 55. A second terminal of resistor 54 is connected input 12 and a second terminal of resistor 55 is connected to return 13. An inverting input of comparator 36 is connected to a first terminal of resistor 56 and a cathode of diode 39. An anode of diode 39 is connected to return 13. A second terminal of resistor 56 is connected to output 20. An output of comparator 36 is connected to the gate of transistor 37 and to an anode of diode 51. The cathode of diode 51 is connected to the output of amplifier 31 and to a first terminal of capacitor 49. A second terminal of capacitor 49 is connected to an inverting input of amplifier 31 and to a first terminal of resistor 48. A second terminal of resistor 48 is connected to an output of buffer 34 and to a first terminal of resistor 52. A non-inverting input of amplifier 31 is connected to the output of amplifier 32 and to a first terminal of capacitor 47. A second terminal of capacitor 47 is connected to an inverting input of amplifier 32 and to a first terminal of resistor 46. A non-inverting input of amplifier 32 is connected to node 27. A second terminal of resistor 46 is connected to the output of amplifier 33 and to a first terminal of both resistor 44 and capacitor 43. A second terminal of both resistor 44 and capacitor 43 are connected to return 13. An inverting input of amplifier 33 is connected to return 13. Buffer 34 has a non-inverting input connected to the non-inverting input of amplifier 33 and to a first terminal of resistor 38. A second terminal of resistor 38 is connected to return 13. The inverting input of buffer 34 is connected to a second terminal of resistor 52 and to a first terminal of resistor 53. A second terminal of resistor 53 is connected to return 13. A source of transistor 37 is connected to output 20 and a drain is connected to return 13 while a sense output of transistor 37 is connected to the non-inverting input of amplifier 33 and buffer 34. A base of transistor 29 is connected to node 24, a collector is connected to return 13, and an emitter is connected to the output of amplifier 32.

Figure 3:
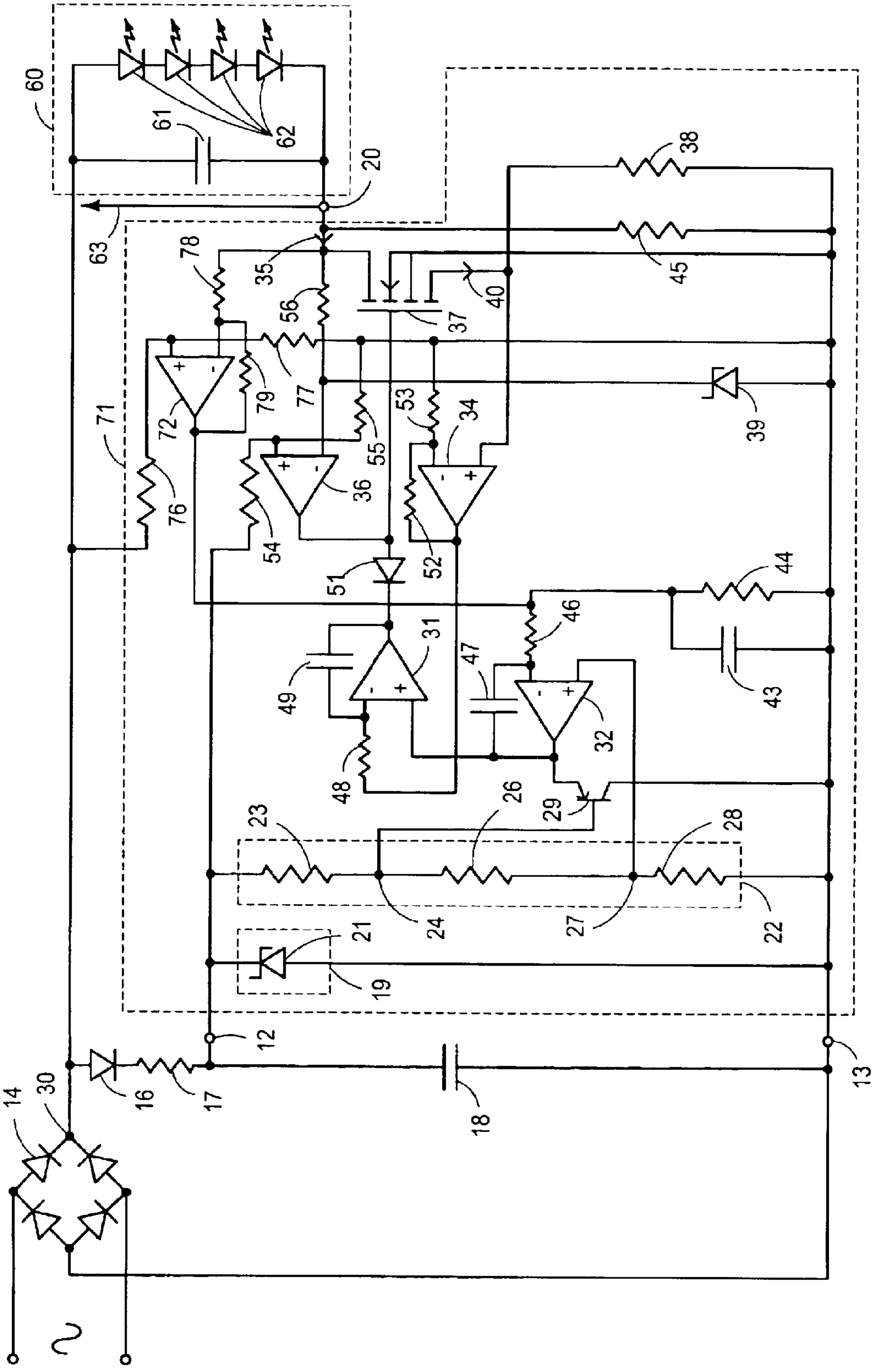
FIG. 3 schematically illustrates a portion of another embodiment of a power supply system in accordance with the present invention.

FIG. 3 schematically illustrates an embodiment of a portion of a power supply system 70 having a power supply controller 71 that is an alternate embodiment of controller 11 described in the description of FIG. 1 and FIG. 2. Controller 71 functions similarly to controller 11 but uses load voltage 63 instead of sense current 40 as an input to establish the average value of load current 35. Controller 71 includes a differential amplifier 72 that receives load voltage 63 between the inverting and non-inverting inputs of amplifier 72 and provides an output voltage representative of load voltage 63. The relationship of the output voltage of amplifier 72 is related to load current 35 by the value of the impedance of load 60. The output voltage of amplifier 72 is averaged by the averaging circuit as explained in the description of FIG. 1, thus, the averaging filter along with amplifier 72 form the averaging circuit that is formed to generate the averaged signal. The output of amplifier 72 is feed into the inverting input of amplifier 32 which is then compared to the reference voltage at node 27. Amplifier 32 generates an error signal similar to that of the circuit in FIG. 1 only it is representative of error between the output voltage 63 and reference voltage at node 27. In this manner it adjusts the peak current to give an average current that when dropped across the impedance of load 60 it creates the desired voltage for load voltage 63.

Figure 4:
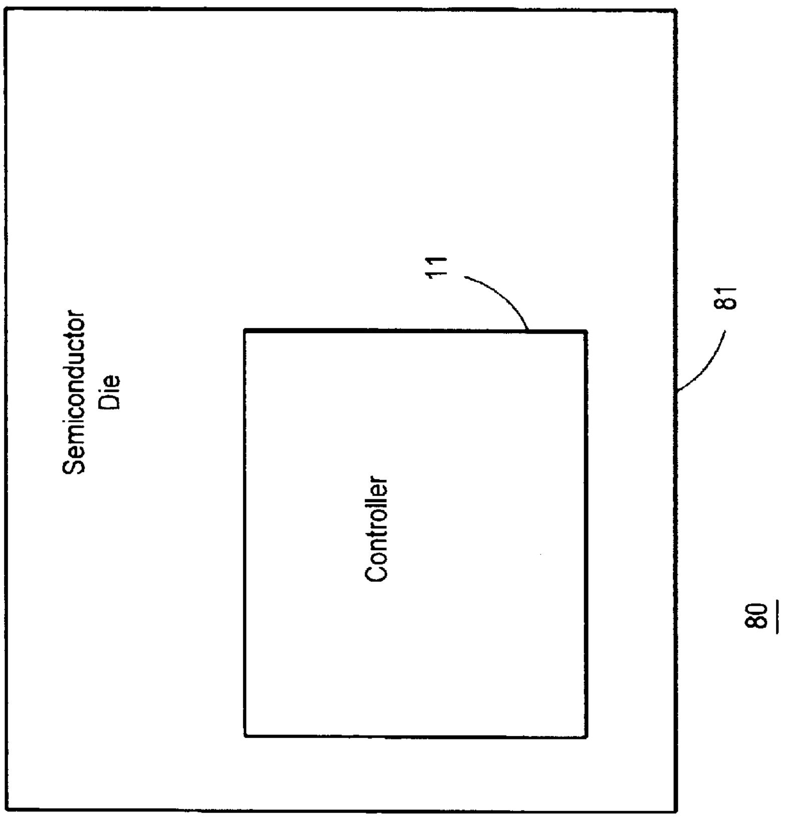
FIG. 4 illustrates an enlarged plan view of a semiconductor die on which the power supply system of FIG. 1 is formed in accordance with the present invention.

FIG. 4 schematically illustrates an enlarged plan view of a portion of an embodiment of a semiconductor device 80 that is formed on a semiconductor die 81. Controller 11 is formed on die 81. Die 81 may also include other circuits that are not shown in FIG. 4 for simplicity of the drawing.

In view of all of the above, it is evident that a novel device and method is disclosed. Forming controller 11 as a linear regulator reduces the complexity of controller 11 and system 10 thereby reducing the associated costs. Forming the active zone as a voltage band that keeps the output voltage close to the input voltage and provides efficient linear operation of controller 11 and system 10. Disabling the output transistor at voltages greater than the active zone reduces the voltage drop across the output transistor and further improves efficiency.

What is claimed is:

1. A power supply control method comprising:

coupling an input of a power supply system to receive an input voltage having a waveform of a rectified sine wave having a non-zero period for each cycle of the waveform;

coupling a load to receive the input voltage;

configuring a power supply controller to generate a load current through the load during a portion of a cycle of the input voltage when the input voltage is between a first voltage value and a second voltage value wherein the first voltage value and the second voltage value are less than a maximum value of the input voltage; and configuring the power supply controller to determine an average value of the load current, determine a difference between the average value of the load current and a desired average value, and to use the difference and an instantaneous value of the load current to control the instantaneous value of the load current during the portion of the cycle to regulate the average value of the load current over the period to the desired average value of the load current.

2. The method of claim 1 further including forming the power supply system to disable the load current when the input voltage is less than the first voltage.

3. The method of claim 1 wherein coupling the input of the power supply system to receive the input voltage includes coupling the input of the power supply system to receive a rectified dc voltage.

4. The method of claim 1 wherein configuring the power supply controller to generate the load current through the load during the portion of the cycle of the input voltage when the input voltage is between the first voltage value and the second voltage value includes forming the power supply controller to drive an output transistor of the power supply controller in a linear mode to generate the instantaneous current.

5. The method of claim 4 further including forming the power supply controller to disable the load current when a voltage drop across the output transistor is a third voltage that is representative of the second voltage.

6. The method of claim 4 wherein forming the power supply controller to drive the output transistor of the power supply controller in the linear mode to generate the instantaneous current includes forming the power supply controller to generate an averaged signal that is representative of the average value of the load current over the cycle.

7. The method of claim 6 wherein forming the power supply controller to drive the output transistor of the power supply controller in the linear mode to generate the instantaneous current includes forming the power supply controller to generate a deviation signal representative of a difference between the averaged signal and a reference signal, and to generate an error signal representative of a difference between the deviation signal and the instantaneous current.

8. The method of claim 1 wherein configuring the power supply controller to generate the load current through the load during the portion of the cycle of the input voltage when the input voltage is between the first voltage value and the second voltage value includes forming the power supply controller to generate the load current each cycle when the input voltage is greater than the first voltage value and less than the second voltage value.

9. A power supply controller comprising:

an averaging circuit coupled to receive an input signal representative of a load current through a load of the power controller and form an averaged signal representative of an average value of the load current, the averaging circuit having a transconductance amplifier coupled to receive the input signal and a filter coupled to an output of the transconductance amplifier;

a first amplifier coupled to receive the averaged signal and a first reference voltage and responsively form a deviation signal representative of a difference between the averaged signal and the first reference voltage;

a second amplifier coupled to receive the deviation signal and the input signal and responsively drive an output transistor to generate the load current through the load on a current output of the power controller; and a disable circuit coupled to responsively disable the output transistor when a voltage across the output transistor is greater than a first value.

10. The power supply controller of claim 9 wherein the averaging circuit coupled to receive the input signal representative of the load current through the load of the power controller and form the averaged signal representative of the average value of the load current includes a sense circuit coupled to receive the load current, generate a sense current representative of the load current, generate a sense voltage from the sense current, and use the sense voltage as the input signal.

11. The power supply controller of claim 9 wherein the disable circuit coupled to responsively disable the output transistor when the voltage across the output transistor is greater than the first value includes a comparator coupled to receive the voltage across the output transistor and a reference voltage and responsively disable the output transistor.

12. The power supply controller of claim 11 wherein the comparator coupled to receive the voltage across the output transistor and the reference voltage and responsively disable the output transistor includes the comparator coupled to disable the output transistor when the first voltage is between two and fifteen volts.

13. The power supply controller of claim 9 wherein the first amplifier coupled to receive the averaged signal and a first reference voltage includes a differential amplifier.

14. A method of forming a power supply controller comprising:

coupling an output transistor to form a load current through a load that is coupled to an output of the power supply controller;

forming an averaging circuit to receive an input signal representative of the load current and responsively form an averaged signal representative of an average value of the load current, including coupling a first amplifier to receive the input signal, coupling a filter to receive an output of the first amplifier, and coupling the output of the first amplifier to an input of a second amplifier;

forming the power supply controller to generate a deviation signal representative of a difference between the averaged signal and a desired constant;

forming the power supply controller to drive the output transistor responsively to a difference between the deviation signal and the input signal to generate an instantaneous value of the load current that will result in an average value of the load current over a first time period; and forming a disable circuit coupled to responsively disable the output transistor when a voltage across the output transistor is greater than a first value.

15. The method of claim 14 wherein forming the disable circuit coupled to responsively disable the output transistor when the voltage across the output transistor is greater than the first value includes forming the disable circuit to disable the output transistor at least once during the first time period.

16. The method of claim 14 wherein forming the power supply controller to generate the deviation signal representative of the difference between the averaged signal and the desired constant includes forming a deviation circuit having an amplifier coupled to receive the averaged signal and a reference signal and responsively form the deviation signal representative of the difference between the averaged signal and the reference signal.

17. The method of claim 14 wherein forming the power supply controller to drive the output transistor responsively to the difference between the deviation signal and the input signal includes forming the output transistor to sink the load current from the load wherein the load current is supplied by a rectified dc voltage applied to the load and wherein a period of the rectified dc voltage forms the first time period.

18. The method of claim 14 wherein forming the disable circuit coupled to responsively disable the output transistor when the voltage across the output transistor is greater than the first value includes forming a comparator coupled to receive the voltage across the output transistor and receive a reference voltage and responsively disable the output transistor when the voltage across the output transistor is greater than the reference voltage.

* * * * *